(12) United States Patent
St. Louis (10) Patent No.: US 9,644,138 B2
(45) Date of Patent: May 9, 2017

(54) PROCESS AND APPARATUS FOR MAKING PROPPANTS

(76) Inventor: Daniel Mark St. Louis, Wichita, KS (US)

(*) Notice: Subject to any disclaimer, the term of this patent is extended or adjusted under 35 U.S.C. 154(b) by 597 days.

(21) Appl. No.: 14/126,908

(22) PCT Filed: Jun. 19, 2012

(86) PCT No.: PCT/US2012/043125
§ 371 (c)(1),
(2), (4) Date: Dec. 17, 2013

(87) PCT Pub. No.: WO2012/177625
PCT Pub. Date: Dec. 27, 2012

(65) Prior Publication Data
US 2014/0138862 A1    May 22, 2014

Related U.S. Application Data

(60) Provisional application No. 61/499,791, filed on Jun. 22, 2011.

(51) Int. Cl.
*C09K 8/80* (2006.01)
(52) U.S. Cl.
CPC ................................ *C09K 8/80* (2013.01)

(58) Field of Classification Search
CPC .................. C09K 8/80; B01J 2/16; B01J 2/04
See application file for complete search history.

(56) References Cited

U.S. PATENT DOCUMENTS 3,457,336 A * 7/1969 Harris ........................ B01J 2/04
264/14

* cited by examiner

*Primary Examiner* — Stella Yi
(74) *Attorney, Agent, or Firm* — Melanius D'Souza (57) ABSTRACT

A highly efficient process is disclosed for making proppants from generally non-spherical or discretized raw material, such as naturally occurring sand or pelletized refractory material. In one embodiment of the process, the discretized material is heated by a counter-current flow of hot gas in a first Moving Bed Gas-Solids Direct Contact Heat Exchanger (MBGSDCHX). The heated discretized material is then further heated to a transformative temperature by a raw material transformation means to a partially or fully melted state in which the discretized raw material assumes generally spherical shapes. The spheres are then cooled by a counter-current flow of cold gas in a second MBGSDCHX. The cooled spheres are then size-classified for use as proppants. In an alternate embodiment, refractory raw material is melted and then discretized into molten drops. The molten drops are cooled and frozen into generally spherical shapes. The cooled spheres are used as proppants.

2 Claims, 4 Drawing Sheets

PROCESS AND APPARATUS FOR MAKING PROPPANTS

CROSS-REFERENCE TO RELATED APPLICATIONS

This application claims priority from U.S. Provisional Application Ser. No. 61/499,791 filed on Jun. 22, 2011.

FIELD OF THE INVENTION

The present invention relates to a process and apparatus for making proppants for use in the extraction of natural gas and crude oil.

BACKGROUND

Natural gas and crude oil are extracted from the earth by drilling holes in the earth. A recent development in oil and gas extraction is horizontal drilling. In horizontal drilling, the drill is first inserted vertically into the earth until it reaches the required depth. The drill is then turned at an angle to penetrate horizontally into the geological layer. Thus the drill is able to access a wider area to increase the probability of striking a pocket of natural gas or crude oil. To further increase the flow of natural gas or crude oil, a fracturing fluid is injected at great pressure into the hole. The fracturing fluid permeates into the earth and opens up or creates additional flow channels for the flow of natural gas or crude oil into the hole. However, when the fracturing fluid is withdrawn, these flow channels are susceptible to collapse under the weight of the earth above them. Thus, some means is required to prop open the flow channels to prevent them from collapsing when the fracturing fluid is withdrawn.

A popular means of propping open the flow channels is by injecting "proppants" into the flow channels. Proppants are solids which can be carried by the fracturing fluid into the flow channels. When the fracturing fluid is withdrawn, the proppants remain wedged in the flow channel to "prop" up the flow channel. Thus for a proppant to be effective, it has to be strong enough to resist crushing by the earth above it and it should be large enough so the natural gas or crude oil can flow easily through the interstitial spaces between the proppants.

Proppants can be naturally occurring materials such as sand, quartz pebbles, etc. Alternately, they can be manufactured materials such as ceramic spheres. In yet another embodiment, proppants are coated with a resin to provide smooth yet tacky surfaces which can be easily inserted into the flow channels and remain in place after the fracturing fluid is withdrawn. A comprehensive description of various kinds of proppants is given in an article titled "Proppants: Where in the World" published in Journal of Petroleum Technology (April 2011).

All of these conventional methods and proppants have various disadvantages. For example, natural proppants are rarely uniformly sized and spherical. Thus they tend to clog and are difficult to insert into the flow-channels. Further, because they are not spherical, they are more susceptible to break under the pressure of flow channel walls.

Ceramic proppants are generally made by rotating wet clay in rotary mixers in a batch process until the clay forms somewhat spherical balls. It is difficult to control the size distribution of the product of this process. Since certain sizes of balls are more desirable, the non-desirable sizes of balls have to be rejected. This reduces the yield of the process. Further this process is capital and energy intensive because it requires many rotary mixers which have to be operated for a long time to form the balls.

U.S. Pat. No. 4,440,866 to Lunghofer, et al. describes a process for the production of sintered bauxite spheres by continuous spray-granulation of an aqueous binder-containing aluminous ore suspension to form granules which are subsequently sintered. Suitable starting materials include ores of high aluminum silicate content. However sintering produces proppants which are not very crush resistant and are therefore not commercially viable for use in natural gas and oil fracking operations.

U.S. Pat. No. 5,558,822 to Gitman et al. describes a continuous process for melting the surface of sand particles to make them more spherical and therefore more suitable for use as proppants. However, the process as described is not very practical as it is very energy intensive and therefore not economically viable.

There is therefore a need for a process and apparatus that will produce proppants of the desired size with very little rejection in an energy efficient manner.

SUMMARY

In a preferred embodiment, a very efficient process for making proppants from solid non-spherical discrete particles such as sand is disclosed. In a first step of the process, the particles are heated while in a free-falling state to a temperature sufficient to partially or fully melt each discrete particle. In the melted state, the geometry is re-configured by surface tension forces to a generally spherical shape while the particle is in free-fall and then cooled to freeze the particle in the spherical shape.

In another preferred embodiment, a very efficient process for making proppants from solid raw materials is disclosed. In a first step of the process, the raw material is discretized into individual particles. The discretized particles are then heated while the particles are in a free-falling state to a temperature sufficient to partially or fully melt each discrete particle. In the melted state, the geometry is re-configured by surface tension forces to a generally spherical shape while the particle continues in free-fall and then cooled to freeze the particle in the spherical shape. The discretization of the raw materials into discrete particles is performed by one or more discretization operations which are well known in the art such as pelletization, rolling, grinding, and spray forming.

In yet another preferred embodiment, a very efficient process for making for making proppants from solid raw materials is disclosed. In a first step of the process, the raw material is heated to a generally molten liquid state. The molten liquid raw material is then discretized into discrete particles which then assume generally spherical shapes. The spherical particles are then cooled while in a free-falling state to form generally spherical solid particles. The discretization of the molten liquid raw material into generally spherical shaped discrete particles is performed by one or more discretization operations such as pressure spray atomization, bessemerization, shearing with a shearing disc, shearing with a shearing wheel, and acoustic discretization.

In yet another preferred embodiment, a very efficient process for making proppants from solid generally non-spherical discrete particles such as sand is disclosed. In a first step of the process, the particles are free-falled into a countercurrent flow of hot gas to transfer the heat from the gas to the particles. The particles are further heated while in free-fall to a temperature sufficient to partially or fully melt each discrete particle to enable the particles to assume generally spherical shapes and then cooled to freeze the particle in the spherical shape The particles are further cooled while in free-fall in a countercurrent flow of cold gas to transfer the heat from the particles to the gas thereby cooling the particles and heating the gas for use in the first step described above. As an optional step, the raw material can be first descretized prior to the first step described above. The discretization of the raw materials into discrete particles is performed by discretization operations such as pelletization. Further heat recovery can occur after the particle has solidified but is still quite hot and is being moved towards storage and even while cooling in a storage vessel. Yet further heat recovery can occur upstream of the transformation zone where the hot working gas is passed through particles which have been stored and/or are being transported to the transformation zone.

In yet another preferred embodiment, a very efficient process for making proppants from solid raw material is disclosed. The process comprises the first step of preheating the raw material in a countercurrent flow of hot gas to transfer the heat from the gas to the raw material, thereby heating the particles and cooling the gas. The raw material is then heated to generally convert the bulk mass of the raw material to a molten liquid state. Next, the molten liquid raw material is discretized into discrete particles which then assume a generally spherical shape and then cooled to freeze the particle in the spherical shape. Finally the generally spherical particles are free-falled into a countercurrent flow of cold gas to transfer the heat from the particles to the gas, thereby cooling the particles and heating the gas for use in the first step described above. Further counter current cooling of the particles and heating of the cold gas can occur after the free fall where the particles have landed and accumulated for storage or further transport. The discretization of the molten liquid raw material into discrete particles is performed by one or more discretization operations such as pressure spray atomization, bessemerization, shearing with a shearing disc, or shearing with a shearing wheel.

DETAILED DESCRIPTION OF PREFERRED EMBODIMENTS

The following is a list of terms used in this disclosure and their specific meanings as applied herein.

"Low-Grade Sand" is sand that in its natural state is unsuitable for use as a proppant without further processing aside from size classification. It is generally referred to herein as "sand".

"Preheating" means the heating of cold raw material by hot gas. Thus the temperature of the raw material rises while the temperature of the hot gas is reduced in the section of the apparatus where the preheating takes place.

"Cooling" means the reduction of the temperature of hot or melted or partially melted raw material by direct contact heat-transfer with a relatively cooler gas or by loss of heat through radiant heat transfer. Thus the temperature of the raw material is reduced while the temperature of the gas increases in the section of the apparatus where the cooling takes place.

A "Moving Bed Gas-Solids Direct Contact Heat Exchanger (MBGSDCHX)" is an apparatus in which heat is directly transferred between a continuous or intermittent flowing mass of solids and a continuous or intermittent flowing mass of gas without a separating medium between the solids and the gas. The solids may be closed packed or expanded due to drag forces from the moving gas.

A "Free Fall Zone (FFZ)" is a section of the proppant making apparatus wherein solid particles are suspended in a gas and descend in a generally downwards direction under the influence of gravity against a generally upwards flow of the gas.

"Discretizing" means converting a single mass of raw materials into smaller pieces or particles such as pellets.

"Discretized Raw Material (DRM)" is raw material which is divided into smaller particles either naturally (for example, sand) or mechanically (for example, pellets formed from a dough).

A "particle" is either a naturally occurring mass such as a particle of sand or a fragment of a larger mass of raw materials.

"Transformative temperature" is the temperature at which the raw material is transformed either chemically or physically or both into a product having desired characteristics.

"Transformed material" is raw material which has been heated to a transformative temperature and is in a totally melted liquid state or in a melted agglomorative state or in a surface melted state.

"Raw Material Transformation Means (RMTM)" is an apparatus wherein heat energy is provided to the raw materials to raise the raw materials to the Transformative Temperature to transform the raw materials to materials having the desired physical or chemical properties. The heat energy can be provided by combustion of a fossil fuel such as natural gas or propane or butane or process off-gas or flare-gas or any other gaseous fossil fuel or by combustion of a liquid fossil fuel such as oil. Alternately, the heat energy can be provided by the combustion of a solid fossil fuel such as coal or kerogen rich shale. Yet alternatively, the heat energy can be provided by burning waste combustible materials such as plant products or even waste paper or other landfill-directed combustible materials. Yet alternately, the heat energy can be provided by electrical energy such as by a heating coil, an induction coil, microwave energy, or an electric arc. The heat energy may be provided to the raw materials directly by burning the fossil fuel in the RMTM or indirectly by burning the fuel in an external combustion chamber and directing the hot combustion gases therefrom into the RMTM.

"Spheroidzation temperature" is the minimum temperature at which the surface of a generally non-spherical particle starts to melt or soften to a condition at which the particle begins to assume a generally spherical shape through surface tension.

"Melting temperature" is the minimum temperature at which the raw material melts and assumes a generally liquid form.

A "Bessemer pipe" is a pipe which injects a stream of high-pressure gas or vapor into a molten mass of raw material.

"Bessemerization process" is a process wherein a melted stream of raw material is comminuted by being struck with a stream of high-pressure gas or vapor from the Bessemer pipe.

A "shearing disc" is a rotating disc on which a liquid stream is directed. The rotation of the disc shears the liquid stream into droplets.

A "shearing wheel" is a rotating wheel or drum on which a liquid stream is directed. The rotation of the disc shears the liquid stream into droplets.

"Gas-solids separation means" is a device (such as a cyclone, an electrostatic precipitator, filter, baghouse filter and others) to remove entrained solids from a fluid.

Figure 1:
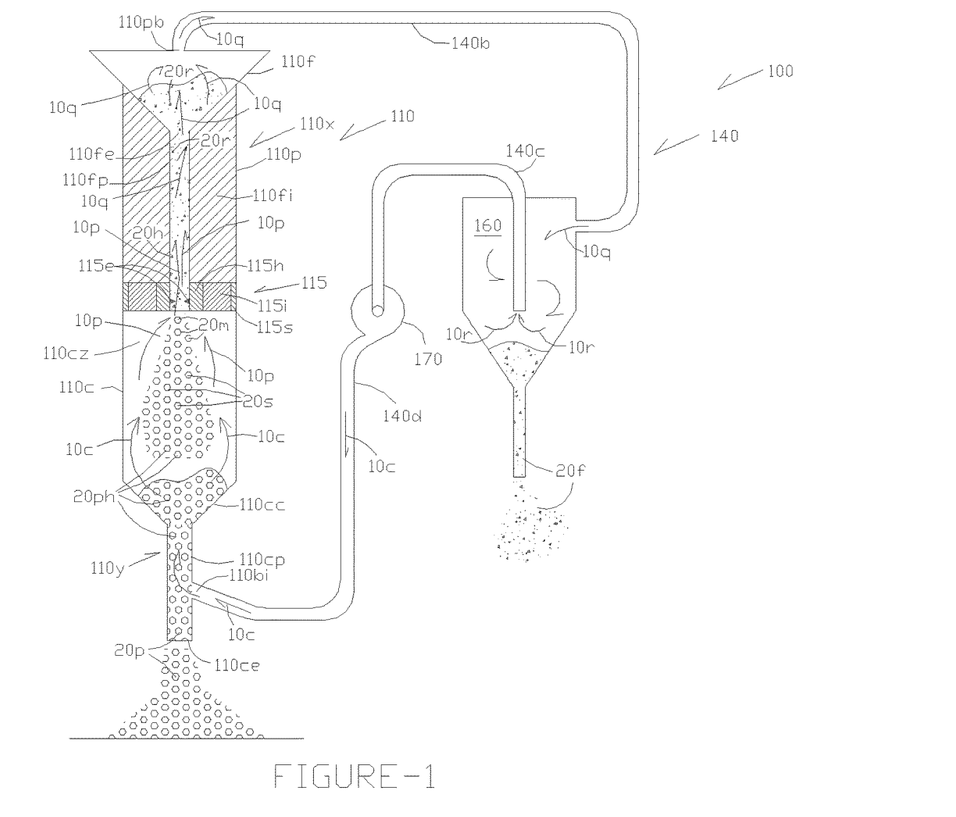
FIG. 1 is a schematic representation of a process and apparatus to produce ceramic proppants according to the embodiment described herein.

Refer now to FIG. 1, which represents an apparatus 100 for making ceramic proppants. Proppant making apparatus (PMA) 100 comprises a vertically oriented cylindrical or other cross-section conversion tower 110, a cyclone 160, a re-circulation blower 170, and interconnecting re-circulation ductwork 140.

Raw material 20$r$ is converted into proppants 20$p$ in conversion tower 110. Raw material 20$r$ could be a loose aggregate of naturally occurring particles such as sand or a mixture of refractory materials. The refractory materials could be pelletized in a prior pelletizing operation. Description of suitable raw materials is given in "Modern Ceramic Engineering" by David W. Richerson ($2^{nd}$. Edition) which is incorporated by reference herein. Conversion tower 110 comprises an upper cylindrical preheating section 110$p$ and a lower cylindrical cooling section 110$c$. A conical feed hopper 110$f$ is located at the upper end of preheating section 110$p$. Raw material 20$r$ flows downwards out of outlet 110$fe$ of hopper 110$f$ into MBGSDCHX 110$x$ which is configured as a passage 110$fp$ located in preheating section 110$p$. To conserve heat, passage 110$fp$ is externally insulated with a suitable insulation 110$fi$. In MBGSDCHX 110$x$, hot gas 10$p$ which is heated in cooling section 110$c$ described below flows upwards in passage 110$fp$ into hopper 110$f$. As hot gas 10$p$ contacts the cooler raw material 20$r$ in passage 110$fp$, heat is very efficiently transferred from hot gas 10$p$ to raw material 20$r$. Thus in passage 110$fp$, cold raw material 20$r$ is heated to hot raw material 20$h$ and hot gas 10$p$ is cooled to cooler gas 10$q$. Depending on the length of passage 110$fp$ and the velocity of hot gas 10$p$, the heat transfer in passage 110$fp$ will be very efficient. Therefore, it is contemplated that the temperature of cooled gas 10$q$ in hopper 110$f$ will be higher than the temperature of raw material 20$r$ in hopper 110$f$ by only a few degrees.

Raw material 20$r$ may move downwards in passage 110$f$ as a generally packed bed. Alternately the velocity of hot gas 10$p$ in passage 110$fp$ may be increased to fluidize raw material 20$r$ in passage 110$fp$ to increase the rate of heat transfer from hot gas 10$p$ to raw material 20$r$. However, the velocity has to be lower than the terminal velocity of the raw material particles to ensure a net downwards flow of raw material 20$r$ in passage 110$fp$. The velocity of hot gas 10$p$ may be adjusted to increase or decrease the dwell time of the raw material particles in the hot zone to allow the particles to reach the desired temperature.

A Raw Material Transformation Means (RMTM) 115 through which heated raw material 20$h$ passes from passage 110$fp$ to cooling section 110$c$ is located at the bottom outlet of passage 110$fp$. RMTM 115 further heats raw material 20$h$ to the transformative temperature (either a surface or bulk melting temperature) to transform the raw materials to a desired physical (for example a partially or fully melted state shown as 20$m$ in FIG. 1) or to a desired chemical state.

RMTM 115 is configured as a cylinder of very high temperature resistant material 115$h$ surrounded by high temperature insulating material 115$i$ surrounded and supported by structural material such as a metal shell 115$s$. RMTM 115 contains suitable heat input means such as an electric heating means, for example, arc electrode 115$e$, or a fuel combustion means (not shown) to provide the highest temperature within the system. Hot gas 10$p$ flows upwards through RMTM 115 while hot raw material 20$h$ passes downwards through RMTM 115. As hot raw material 20$h$ passes downwards through RMTM 115, it is further heated to a desired transformative temperature and is transformed either into surface melted or fully melted particles 20$m$ as shown in more detail on FIG. 2. Alternately, hot raw material can be totally melted into a molten mass and then discretized as described below for FIGS. 3 to 5.

Melted particles 20$m$ are then allowed to free fall into the Free-Fall Zone 110$cz$ of cooling section 110$c$ of apparatus 110 wherein they are contacted by relatively cooler gas 10$c$. In FFZ 110$cz$, melted particles 20$m$ are spheroidized by surface tension into generally spherical particles 20$s$. The spherical particles are then cooled to hot proppants 20$ph$ by direct contact with a counter-flowing cooler gas 10$c$ which is heated to hot gas 10$p$ and is passed into RMTM 115. Hot proppants 20$ph$ are collected in conical bottom 110$cc$ of cooling section 110$c$ from which they exit into MBGSD-CHX 110$y$ which is configured as outlet passage 110$cp$. A gas inlet 110$bi$ is provided in outlet passage 110$cp$ to introduce cold gas 10$c$ into apparatus 110. As cold gas 10$c$ flows upwards in passage 110$cp$, it contacts downwards moving hot proppants 20$ph$ and is heated. Cooled finished proppants 20$p$ are removed from apparatus 110 through outlet 110$ce$. Depending on the length of passage 110$cp$ and the velocity of cold gas 10$c$, the heat transfer in passage 110$cp$ will be very efficient. Therefore, it is contemplated that the temperature of cooled finished proppants 20$p$ will be higher than the temperature of cold gas 10$c$ in passage 110$cp$ by only a few degrees.

Hot proppants 20$ph$ may move downwards in passage 110$cp$ as a generally packed bed. Alternately the velocity of cold gas 10$c$ in passage 110$cp$ may be increased to fluidize hot proppants 20ph in passage 110cp to increase the rate of heat transfer from hot proppants 20ph to cold gas 10c. However, the velocity has to be lower than the terminal velocity of hot proppants 20ph to ensure a net downwards flow of hot proppants 20ph in passage 110cp.

Referring to the upper end of apparatus 110, a gas outlet 110pb is provided through which cooled gas 10p from passage 110fp is removed from hopper 110f. The gas used in the process can be air or nitrogen or carbon-dioxide or any other suitable gas which may be selected for process control, material compatibility, material enhancement, or safety reasons.

Interconnecting ductwork 140 re-circulates cooled gas 10q from gas exit 110pb in conical feed hopper 110f back to gas inlet 110bi in proppant removal passage 110cp as cold gas 10c. Since cooled gas 10q contains fine particles 20f of raw material 20a, a gas-solids separation means such as a cyclone may be located in the gas re-circulation loop to remove fine particles 20f before cooled gas 10q is re-circulated back into cooling section 110c. Also, to maintain the flow of the gas through proppant making apparatus 100, a blower 170 is provided in the gas re-circulation loop.

During operation, cold raw material 20r is introduced into feed hopper 110f. Raw material 20r exits feed hopper 110f through outlet 110fe and flows downwards in passage 110fp of MBGSDCHX 110x wherein it is heated by hot gas 10p which enters passage 110fp from RMTM 115. As raw material 20r falls through hot gas 10p, the heat in hot gas 10p is transferred to cold raw material 20r. Thus raw material 20r gets preheated while hot gas 10p gets cooled. In FIG. 1, the heated raw material is shown as 20h and the cooled gas is shown as 10q. Heated raw material 20h then flows into RMTM 115 wherein it is partially or fully melted as described above.

In RMTM 115, raw material 20h is further heated to a transformative temperature which is generally in the range of 750 to 6,500 degrees Fahrenheit depending on the composition of the raw material to fully or partially melt the raw materials. The melted raw material is shown as 20m in FIG. 1. The appropriate transformative temperatures for various raw materials are shown in FIG. 4.12 in "Modern Ceramic Engineering" by David W. Richerson (2$^{nd}$. Edition) which is incorporated by reference herein.

When melted or partially melted raw material 20m exits RMTM 115, it forms generally spherical hot droplets (shown as 20s) which are allowed to free-fall through a counter-current flow of relatively cooler gas 10c in free fall zone 110cz located in lower cooling section 110c. As the spherical droplets 20s fall through relatively cooler gas 10c, they freeze and the heat in droplets 20s is transferred to cooler gas 10c. Thus cooler gas 10c gets heated while droplets 20s get cooled to form hot proppants 20ph which are collected in the conical bottom 110cc of cooling section 110c. The heated gas, shown as 10p, exits cooling section 110c into first MBGSDCHX 110x. Hot proppants 20ph are passed into second MBGSGCHX 110y wherein their sensible heat is transferred to cold gas 10c. After sufficient cooling has occurred, cooled proppants 20p are removed from apparatus 100 through bottom outlet 110ce.

For maximum thermal efficiency, cooled gas 10q from gas outlet 110pb of hopper 110f is re-circulated back into bottom inlet 110bi of cooling section 110c by ductwork 140. Duct section 140b transports cooled gas 10q to the gas inlet of cyclone 160 wherein any entrained fine particles 20f in cooled gas 10q are removed. If practical, for example when the raw material is refractory material that is melted as a single liquid mass to form the proppants, the fines can be recycled back to hopper 110f to reduce waste and increase the raw material usage efficiency of the process. The cooled clean gas 10r is then transported by duct section 140c from the gas outlet of cyclone 160 to the gas inlet of re-circulation blower 170. In re-circulation blower 170, the pressure of cooled clean gas 10r is increased sufficiently to maintain the circulation of gas through proppant making apparatus 100. Higher pressure clean gas 10c is directed from blower 170 through duct section 140d back into gas inlet 110bi of cooling section 110c of proppant making apparatus 100.

While FIG. 1 shows a cyclone being used to capture the entrained dust in exhaust gas 10q, any other suitable means of capturing the dust such as a baghouse filter may also be used instead of the cyclone. However since the thermal efficiency of the system is contemplated to be very high, the recirculation of the gas and handling of the fines may not be necessary.

It will be obvious to one of ordinary skill in the art that variations could be made to the process and apparatus for making proppants described above. For example, the gas in the process could pass once only through proppant making apparatus 100 without re-circulation. For example, blower 170 could introduce ambient air into apparatus 110 and duct 140b could vent the exhaust from apparatus 110 to the atmosphere without capturing the entrained dust in a baghouse or cyclone. However, it will be quite obvious to persons skilled in the art that re-circulating the gas results in a very efficient and less-polluting system and makes practical the use of specialized gases.

Figures 2, 3:
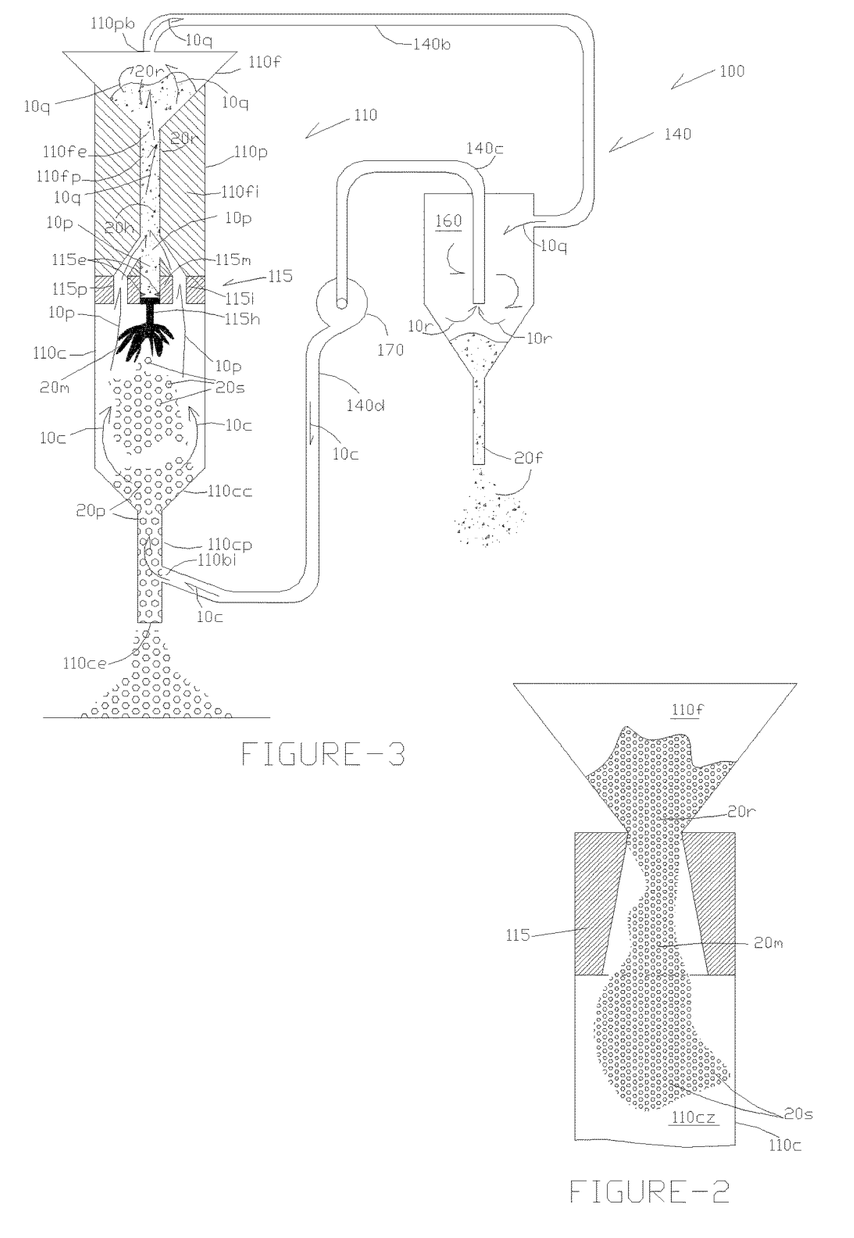
FIG. 2 is a schematic detail of FIG. 1 showing the melting or partial melting of non-spherical raw material particles such as sand, and the cooling of the melted or partially melted raw material particles in a flow of counter-current gas.
FIG. 3 is a schematic representation of an alternate process and apparatus to produce ceramic proppants using operations such as melting, spraying, and cooling in a flow of counter-current gas.

As another example, as shown in FIG. 3, raw material 20r can be fully melted in RMTM 115. Melted raw material 20m can then be sprayed into the cooling section 110c of apparatus 110 into a generally upwards flowing current of cooling gas 10c. During the gravitational cooling process, the droplets of melted raw material 20m will solidify into spheres 20s because of the action of surface tension on the skin of the molten material. As described previously for FIG. 1, spheres 20s are cooled first to hot proppants 20ph and later to cooled proppants 20p. The fluid pressure to spray the melted raw material 20m can be provided by hydrostatic pressure as shown in FIG. 3 or by the application of an external motive force with a fluid pressure increasing means (not shown) such as an impeller or a pump. This process could also be used to practice "Arc Spraying" wherein melted raw material 20m could be used to coat generally non-spherical seed particles to make them generally spherical.

Figure 4:
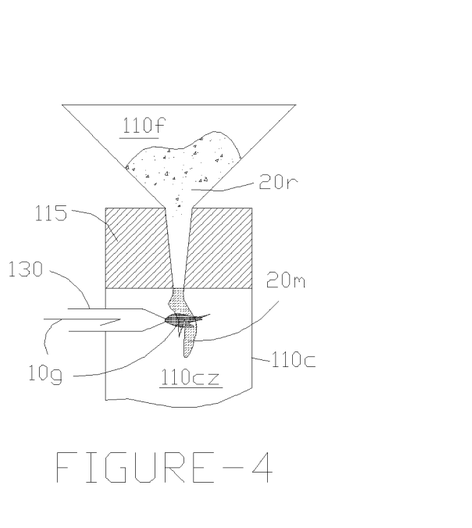
FIG. 4 is a schematic representation of yet another alternate process and apparatus to produce ceramic proppants using operations such as melting, pneumatic fragmentation by blasting with compressed gas, and cooling in a flow of counter-current gas.

In another example shown in FIG. 4, the raw material is melted in RMTM 115 and the melted raw material 20m is blasted with a compressed gas 10g from a Bessemer pipe 130 as it flows into cooling section 110c of apparatus 110. The Bessemerization process is similar to that for making ceramic fiber insulation and is well known in the prior art. When compressed gas 10g hits melted raw material 20m, it breaks it up into little droplets which can then be cooled to solid spheres 20s which as described above can be used as proppants 20p.

Figure 5A:
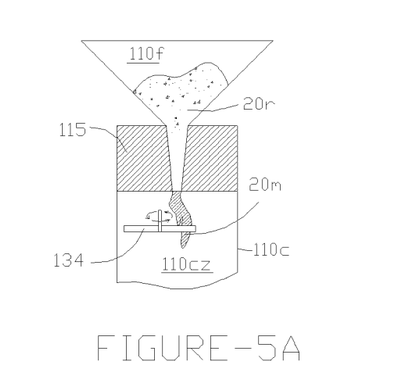
FIG. 5A is a schematic representation of yet another alternate process and apparatus to produce ceramic proppants using operations such as melting and mechanical fragmentation with a spinning wheel or rotor, followed by cooling in a flow of counter-current gas.

In another example shown in FIG. 5A, the raw material is melted in RMTM 115. The melted raw material 20m is fragmented with a shearing means 134 such as a shearing disc or a shearing wheel or a shearing rotor as it flows into cooling section 110c of apparatus 110. The process is also similar to that for making ceramic fiber insulation and is well known in the prior art. When the melted raw material hits shearing means 134, it physically breaks up into little droplets which can then be cooled to solid spheres 20s which can be used as proppants 20p.

Figure 5B:
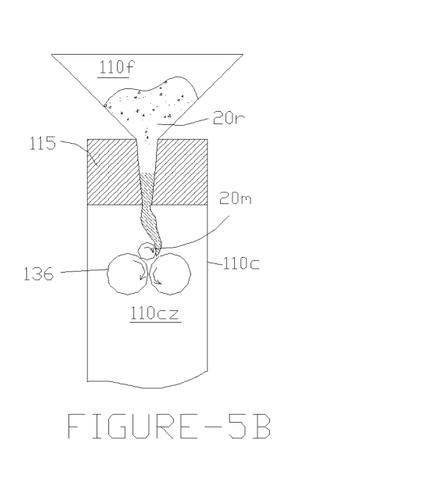
FIG. 5B is a schematic representation of yet another alternate process and apparatus to produce ceramic proppants using operations such as melting and centrifugal fragmentation by pouring the melted raw material on rotating drums, followed by cooling in a flow of counter-current gas.

Another example shown in FIG. 5B is a variation of the mechanical fragmentation process described in FIG. 5A. In the system shown in FIG. 5B, the melted raw material 20*m* is spread on shearing drums 136. The centrifugal forces acting on melted raw material 20*m* hurls fragments of the raw material into the cooling section 110*c* of apparatus 110. As the raw material fragments cool, they solidify into spherical shapes 20*s*. As described previously, the cooled spheres are used as proppants 20*p*. This process is also similar to that for making ceramic fiber insulation and is described in FIG. 1.3 on page 6 of "Ceramic Fiber Insulation Theory and Practice (1987)" from the Energy Conservation. Center, Osaka, Japan, published by The Eibun Press, Howden, P. J. & Faux, S. P. (1996a).

Figure 6:
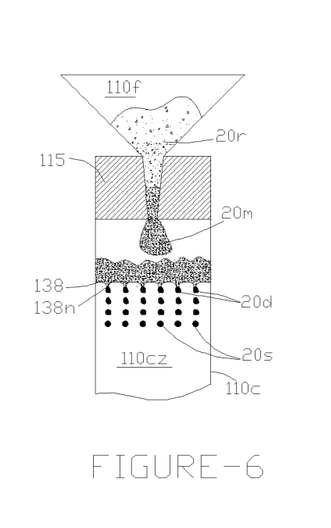
FIG. 6 is a schematic representation of yet another alternate process and apparatus to produce ceramic proppants using operations such as melting, drop-forming by passing the melt through a sieve tray, and cooling in a counter-current flow of gas.

In another example shown in FIG. 6, the melted raw material 20*m* is allowed to collect in an intermediate sieve tray 138 which has a plurality of uniformly sized holes or nipples 138*n*. The melted raw material 20*m* flows out as droplets 20*d* from the nipples into the cooling section 110*p* of apparatus 110. The molten droplets 20*d* are cooled to solid spheres 20*s* which can be collected and used as proppants 20*p*. This variation of the disclosed process is contemplated to produce more uniformly sized proppants because the size of droplets 20*d* can be controlled by the bore of nipples 138*n* on sieve tray 138.

In another example shown in FIG. 2, raw material 20*r* is introduced as non-spherical solid particles (for example, sand) into raw material hopper 110*f* of apparatus 110. As solid particles 20*r* flow out of hopper passage 110*fp*, they free fall into RMTM 115 wherein they heated to their melting point temperature so that the surface of the particles is melted. As the surface-melted particles 20*m* free fall in free-fall zone 110*cz*, the surfaces of particles 20*m* assume generally spherical shapes because of surface tension. The generally spherical particles 20*s* are then cooled to solid spheres which can be used as proppants 20*p*. This process is contemplated to produce more uniformly sized proppants. While the above description states that the particles are heated to melt the surface only, it will be obvious that the particles could be fully melted into liquid drops which would assume a spherical shape, In all of the above examples, the spheres can be cooled in the free-fall zone 100*cz* of cooling section 110*c* of apparatus 110 either by dropping through a zone of quiescent gas or concurrent gas and allowing radiant heat transfer to cool the spheres especially in the initial cooling phase to freeze the particles in a very spherical shape or by blowing cooling gas countercurrently against the falling spheres.

Figure 7:
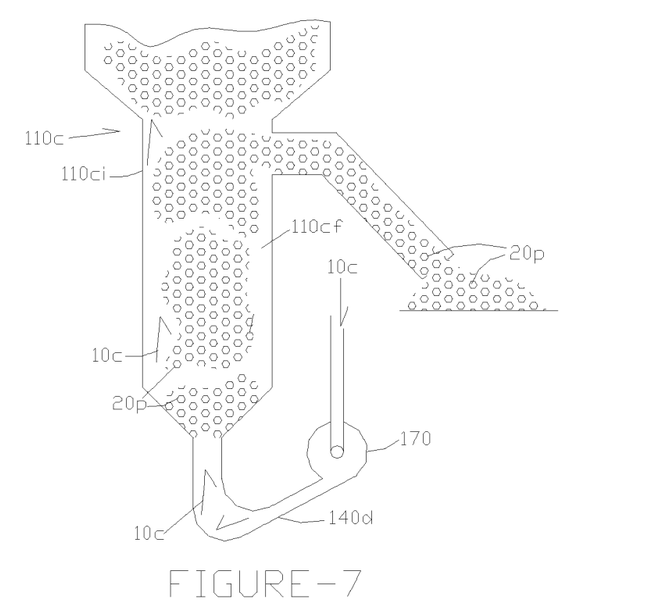
FIG. 7 is a schematic representation of yet another alternate process and apparatus to produce ceramic proppants using operations such as melting or partially melting non-spherical raw material particles such as sand and cooling the melted or partially melted raw material particles in a gas-fluidized bed.

Alternately, as shown in FIG. 7, spheres 20*s* can be allowed to fall into a fluidized bed 110*cf* wherein they are further cooled and removed from an intermediate section 110*ci* of cooling section 110*c* of apparatus 110 along with the fluidizing gas. Fluidized bed 110*cf* can be formed by reducing the diameter of cooling section 110*c* towards the bottom of the tower. The reduced cross-sectional area increases the velocity of cold gas 10*c* to match or slightly exceed the falling terminal velocity of free-falling spheres 20*s* thereby keeping spheres 20*s* in suspension in the gas current. Alternately, the cross-section of cooling section 110*c* can be maintained and a higher amount of cold gas 10*c* can be circulated in the bottom section of cooling section 110*c* to fluidize spheres 20*s*. By using multiple gas removal points, proppants 20*p* can be size-classified.

Figure 8:
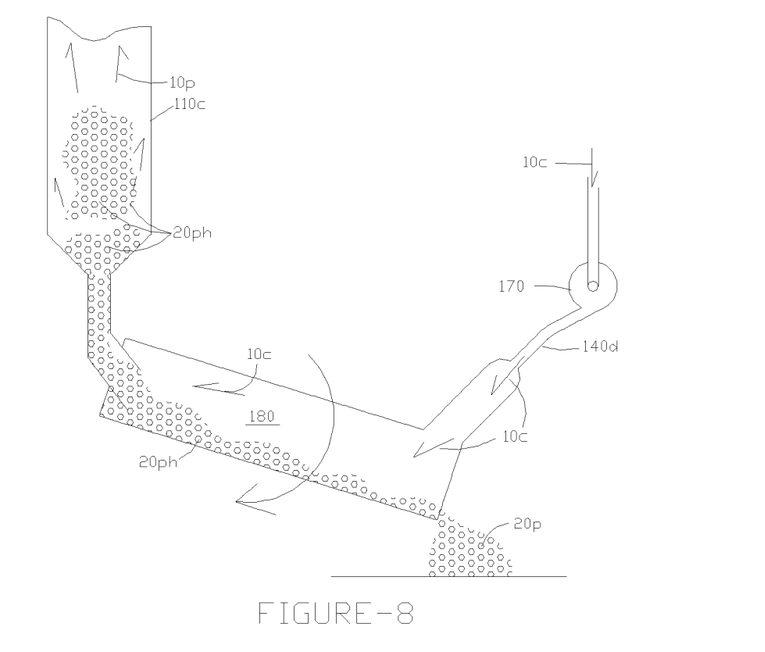
FIG. 8 is a schematic representation of yet another alternate process and apparatus to produce ceramic proppants which uses a rotary cooler for additional heat recovery.

In another example shown in FIG. 8, hot proppant 20*ph* from cooling section 110*c* can be directed into a rotary cooler 180 wherein they are cooled by a stream of countercurrent gas 10*c*. Thus any residual heat in the proppants 20*ph* is recovered by cooling gas 10*c* to provide a very high thermal efficiency for the proppant making process described herein. These and other methods of efficiently recovering residual heat from hot proppants 20*ph* will be obvious to persons having ordinary skill in the art.

As practiced in the prior art, post-processing operations may be carried out to classify the proppants by size. Such operations could include air classification or electrostatic separation such as in a dry precipitator or cyclone separation or floatation or any other well-known methods of classifying particles by size. The size classification may be carried out after formation of the particles and in some cases, where appropriate, before spheroidization. It will be obvious to persons skilled in the art that other raw material in different proportions could be substituted for those disclosed above to make the proppants described above without departing from the spirit of the invention.

Thus, while the above description contains many specific details, these details should not be construed as limiting the scope of the embodiment but merely as providing illustration of one of several possible embodiments. Therefore, the scope of the embodiments should be determined by the following claims and their legal equivalents rather than by the examples described herein.

I claim:

1. A very efficient process for making proppants from solid raw material, the process comprising the steps of:
    a) moving the raw material downwards by gravity in a countercurrent flow of hot gas (the gas being previously heated in step (f) below) to transfer the heat from the gas to the raw material, thereby heating the particles and cooling the gas;
    b) further heating the raw material to generally convert the bulk mass of the raw material to a molten liquid state;
    c) discretizing the molten liquid raw material into molten discrete particles using one or more of the discretization operations selected from the group of discretization operations consisting of pressure spray atomization, bessemerization, shearing with a shearing disc, and shearing with a shearing wheel;
    d) free-falling the molten discrete particles to allow them to assume generally spherical shapes;
    e) cooling and freezing the particles into the generally spherical shapes; and
    f) further moving the generally spherical particles downwards by gravity in a countercurrent flow of cold gas to transfer the heat from the particles to the gas, thereby cooling the particles and heating the gas for use in step (a) above.

2. A very efficient process for producing generally spherical sand which is useful as a proppant using low-grade sand as raw material, the process comprising the steps of:
    a) moving the raw material downwards by gravity in a countercurrent flow of hot gas (the gas being previously heated in step (f) below) to transfer the heat from the gas to the raw material, thereby heating the particles and cooling the gas;
    b) further heating the raw material to generally convert the bulk mass of the raw material to a molten liquid state;
    c) discretizing the molten liquid raw material into molten discrete particles using one or more of the discretization operations selected from the group of discretization operations consisting of pressure spray atomization, bessemerization, shearing with a shearing disc, and shearing with a shearing wheel;

d) free-falling the molten discrete particles to allow them to assume generally spherical shapes;
e) cooling and freezing the particles into the generally spherical shapes; and
f) further moving the generally spherical particles downwards by gravity in a countercurrent flow of cold gas to transfer the heat from the particles to the gas, thereby cooling the particles and heating the gas for use in step (a) above.

* * * * *